United States Patent [19]

Gerber

[11] Patent Number: 5,568,406
[45] Date of Patent: Oct. 22, 1996

[54] STOLEN CAR DETECTION SYSTEM AND METHOD

[76] Inventor: Eliot S. Gerber, 9 Frog Rock Rd., Armonk, N.Y. 10504

[21] Appl. No.: 566,145

[22] Filed: Dec. 1, 1995

[51] Int. Cl.$^6$ ..................................................... G08G 1/01
[52] U.S. Cl. ........................ 364/562; 364/565; 364/436; 116/63 R; 340/937
[58] Field of Search ................................... 364/436, 562, 364/563, 565, 925, 925.3; 116/63 R, 63 P; 342/66, 105; 340/936, 937; 356/27, 28

[56] References Cited

U.S. PATENT DOCUMENTS

| | | | |
|---|---|---|---|
| 4,368,979 | 1/1983 | Ruell | 340/146.3 P |
| 4,947,353 | 8/1990 | Quinlan, Jr. | 364/562 |
| 5,066,950 | 11/1991 | Schweitzer et al. | 340/937 |
| 5,083,200 | 1/1992 | Deffontaines | 340/942 |
| 5,088,827 | 2/1992 | Kyriakis | 356/372 |
| 5,175,617 | 12/1992 | Wallace et al. | 358/133 |
| 5,381,155 | 1/1995 | Gerber | 340/936 |
| 5,422,473 | 6/1995 | Kamata | 340/928 |

Primary Examiner—Emanuel T. Voeltz
Assistant Examiner—Craig Steven Miller
Attorney, Agent, or Firm—Eliot S. Gerber

[57] ABSTRACT

A method and system to detect and identify a target vehicle displaying a switched or invalid license plate includes a license plate reader to read the plate number carried by a target vehicle in its area. A pair of spaced laser beams measures the speed and length of the traveling vehicle. The read license plate numbers are compared with a data base of registered vehicles to obtain the length of the vehicle registered for that plate. If the registered length differs from the measured length, the plate may be illegally on the target vehicle.

29 Claims, 5 Drawing Sheets

STOLEN CAR DETECTION SYSTEM AND METHOD

FIELD OF THE INVENTION

The present invention relates to the detection of auto theft and more particularly to the detection of stolen cars and the detection of cars operating with false or switched license plates.

BACKGROUND OF THE INVENTION

At the present time the theft of automobiles (cars) is an important problem. Despite the best efforts of auto manufacturers, car theft device manufacturers, and the police, car theft remains as one of the most prevalent crimes, resulting in the loss of billions of dollars and high car theft insurance in many areas.

Car manufacturers now produce cars with various anti-theft devices, such as locked steering wheels, keys with microprocessor chips, and remote control locks. In addition, various steering wheel locks and bars are widely used. Another anti-theft system uses a radio transmitter hidden on the car which is activated when the car is reported as being stolen. Despite these devices car theft is still a problem. Many of these devices are useless in a "carjacking" situation in which the car owner is accosted, his keys taken and his car stolen.

When a car is stolen it may be reported to the police almost immediately, for example, if a car is stolen from a mall parking area. The police would be notified of the car's description, ie., "a white 1995 Acura Legend four-door" and its license number, i.e., New York "JWB 123". However, the thief, to prevent being caught, may switch the original license plates with license plates he has brought with him. Consequently the police would not be able to detect and stop the stolen car.

Another problem in traffic law enforcement is to prevent the use of false or switched license plates. For example, someone who does not have a legal license plate, for example, because of his non-payment of insurance, may steal or otherwise obtain license plates from another car, place them on his car and drive with the switched plates.

The issued U.S. patents mentioned below are incorporated by reference. U.S. Pat. No. 4,947,353 uses a scanning laser, which scans at 160 times per second, on one side of a roadway, and a vertical elongated photoelectric detector on the other side, to measure the heights of vehicles. U.S. Pat. No. 5,088,827 discloses a system for measuring the width of a traveling object, such as a wire, being manufactured. U.S. Pat. No. 5,083,200 relates to using a linear camera for obtaining the silhouette of a traveling vehicle to determine if it is a truck etc., using its length and height. U.S. Pat. No. 5,381,155 uses a license plate reader, a speed measuring device, a data base of registered vehicles and a variable message sign to display the names of speeding drivers on the sign. In U.S. Pat. No. 5,066,950 two spaced-part infra-red beams are used to indicate the speed, length and separation of traveling vehicles for photographing speeding vehicles.

The following U.S. patents relate to reading license plates and generating digital signals representing the plate numbers: U.S. Pat. Nos. 4,567,609; 4,817,166; 5,081,685; 5,136,658; 5,175,617; 5,204,573; 5,204,675; 4,731,854; 4,878,248; 5,315,664; 5,425,108

SUMMARY OF THE INVENTION

In accordance with the present invention there is provided a system and method to identify cars which have been reported as being stolen. The system operates on all cars without any addition or device on the cars.

A series of television cameras are mounted at selected locations. Preferably these cameras are those used for warning of speed violations as set forth in U.S. Pat. No. 5,381,155, incorporated by reference herein, so that the same cameras and associated computer systems are used for both purposes. One set of selected camera locations are on the poles on the sides of roads or on overhead support structures spanning roadways or on light fixtures or stop lights which extend over the roadway.

The camera is preferably a rapidly movable camera of the speed-variant type, producing an image of less than 40,000 pixels. The camera is connected to a digital computer, preferably a special,computer having fast digital processing chips (DPC) which has been programmed by software. The computer performs two functions. First, it "reads" the license plate number, preferably by a template matching system. Secondly, it may also be used, optionally, to help identify the car's model and color, again preferably by a template matching system which relies primarily upon the shape and spacing of the car's headlights and rear lights.

The preferred system operates by an exclusion principle in which the license plate of each car within its area ("target car") is automatically read and compared to a data base to retrieve one, or more, physical characteristics of the registered car. The preferred physical characteristics are the length and width of the car. The length and possibly the width is measured. If a target car's measured length is not the same as the length retrieved form the data base for that car's license plate, it may be a switched or false plate and the car may be stolen or unregistered. A warning is generated so that the target car may be stopped by a police officer.

One preferred system to determine the car's length consists of two spaced, or angled, light beams, for example, laser or infra-red beams. The car's speed is determined by the time that elapses from the front of the car interrupting the first light beam until the front of the car interrupts the second light beam. The length of the car is automatically derived by the computer, from the length of time each beam is interrupted by the car, combined with that car's speed.

For example, the system will read a license plate as New York plate "XYZ 123", retrieve from a data bank that the plate was issued for a 1994 Chevrolet Lumina. The computer system has a look-up table showing that a 1994 Chevrolet Lumina has a length of 200.9 inches (510.29 cm) and width of 72.5 inches (184.15 cm). if the measured length of the target car is 220 inches (558.8 cm) and the target car has New York plate "XYZ 123" then the plate may have been switched and the car may be stolen or unregistered.

In many areas only one or two cars are reported stolen each day. The camera system (camera and associated computer system) will read the license plate numbers of all cars and match them with a list of license plates of stolen cars. It will report the match, by a transmission line, to the police. However, often the thief would have switched license plates. The camera system will also, either internally within its computer or by a transmission line to a central computer system (both called "control computer system") report all the license plate numbers of those cars whose size does not match the size of the car for which the plates were issued. The control computer system will then report to the police a description of the possibly stolen car, its location and the switched license plate (the license plate number actually on the possibly stolen car).

BRIEF DESCRIPTION OF THE DRAWINGS

Other objectives and features of the present invention will be apparent from the following detailed description of the invention, taken in conjunction with the accompanying drawings. In the drawings.

DETAILED DESCRIPTION

Figure 1A:
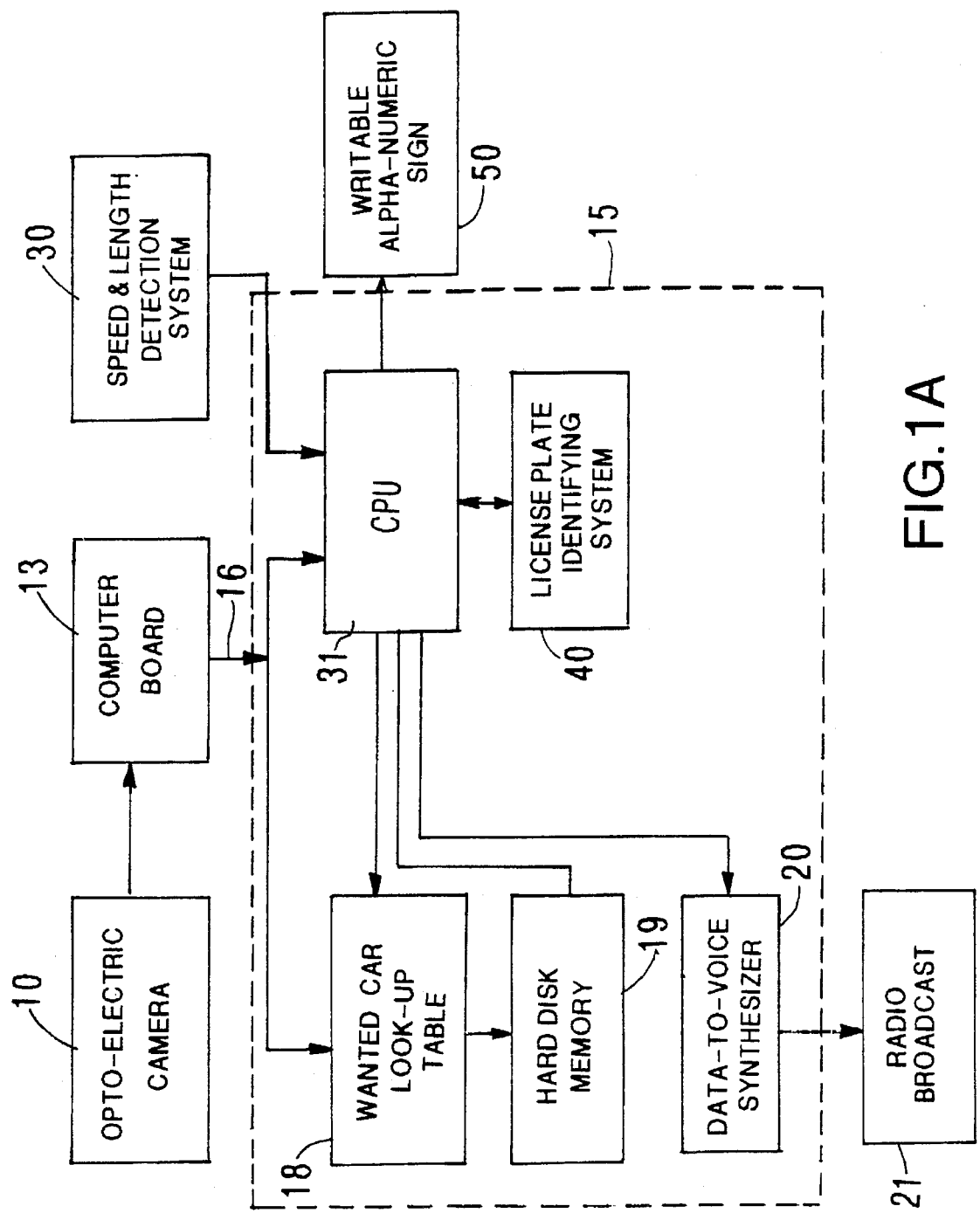
FIG. 1A is a block schematic diagram and FIG. 1B is a flow diagram of the preferred embodiment of the present invention.
Figure 1B:
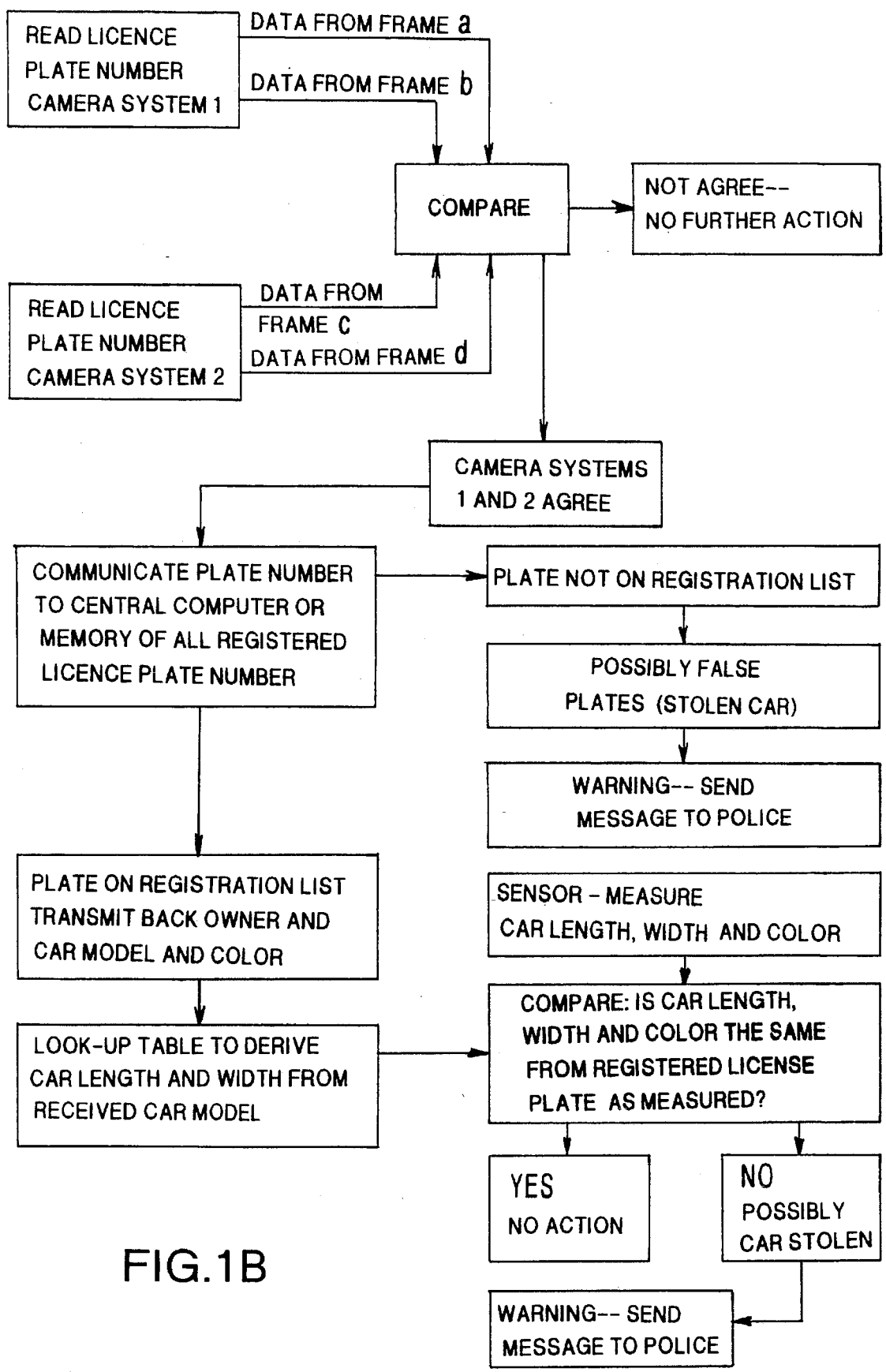

As shown in FIGS. 1 and 2, the system of the present invention includes a first and a second optoelectric video camera 9 and 10 to read the alphanumerics on vehicle license plates. The cameras 9 and 10 are mounted on a support structure 11 above the roadway 12, although alternatively they may be mounted on a post on the side of the roadway 12. Camera 9 is positioned to read the license plate on the front of the target car and camera 10 is positioned to read the license plate on the back of the target car. On a three-lane unidirectional highway, six cameras would preferably be used, with two cameras directed to monitor vehicle traffic in each lane. Accordingly, four cameras would be used on a two-lane bi-directional highway.

The camera systems 9 and 10 take an image of the license plate and then convert the image of license plate numbers into a conventional ASCII digital code. A preferred camera is being developed by Vision Applications Inc. (Allston, Mass.). That camera is utilized in U.S. Pat. Nos. 5,175,617 and 5,204,573. It produces a logmap image from a space-vibrant sensor. The camera is preferably a CCD image sensor (Charge Coupled Device) having 192×165 pixels (31,680 total) with a lens assembly of under 0.5 ounce, the image sensor being mounted on a spherical pointer motor.

The camera systems 9 and 10 read the license plates of all the vehicles passing within their area. Each camera 9 and 10 is electrically connected to a specialized computer board 13 which converts the alpha-numerics of the license plates of vehicles to a digital ASCII code which is transmitted as data stream 16 to computer system 15. Each camera and its computer board constitute a "camera system". That conversion uses algorithms and template matching techniques used in character recognition systems. The license plate characters, in one jurisdiction (state), would be of only font, making their conversion to digital signals relatively simple. Preferably the computer boards 13 are physically mounted on the same support structure 11 as the cameras 9 and 10. The computer board 13, with a suitable time-sharing buffer memory, may be used for a plurality of cameras.

An alternative license plate number reader, which is commercially available, is made by Racal Radio Limited, 472 Basingstoke Road, Reading, Berkshire, England. It reads license plates from a recorded video image (digital image grabber) using pattern recognition techniques and neural networks. The neural networks are trained on a large number of sample characters. That system, called "Talon" (TM), recognizes license plates in about 0.25 seconds; reads plates on cars traveling at high speed; data can be locally stored or transmitted via land-line or radio to a remote site; and reads plates directly from a video image using programmable DSP (Digital Signal Processing) hardware. The system includes a camera, lighting, plate recognition unit (PRU) and keyboard. It displays, among other things, a copy of the video image and a rolling list of license plates, the list output being via a standard RS 232 interface.

The data stream 16, of all license plate numbers, is transmitted to the "wanted car" database and compared to the license numbers in that database. Preferably the "wanted car" database consists of a list of recently stolen cars, "Scofflaw" cars (cars having numerous unsatisfied traffic violations), cars likely to be illegally driven by drivers with suspended licenses, and cars which do not have the legally required minimum insurance.

Real time license plate recognition (LPR) systems are also available from: Gevis GmbH, A-6240 Radfield, Innstrasse 16, Austria (identification time 0.5–0.7 seconds); Perceptics, Knoxville, Tennessee; and are being developed by Zamir Ltd., 17 Hauman St., P.O. Box 53426, Jerusalem 91533, Israel; and Computer Recognition Systems Ltd., Fishponds Close, Wokingham, Berks RG11 2QA, England.

The following U.S. patents have issued on various system relating to license plate recognition (LPR) and are hereby incorporated by reference herein: U.S. Pat. Nos. 5,425,108; 4,787,248; 5,136,658; 5,175,617; 4,817,166; 4,731,854; 5,204,675; 5,204,573.

Figure 2A:
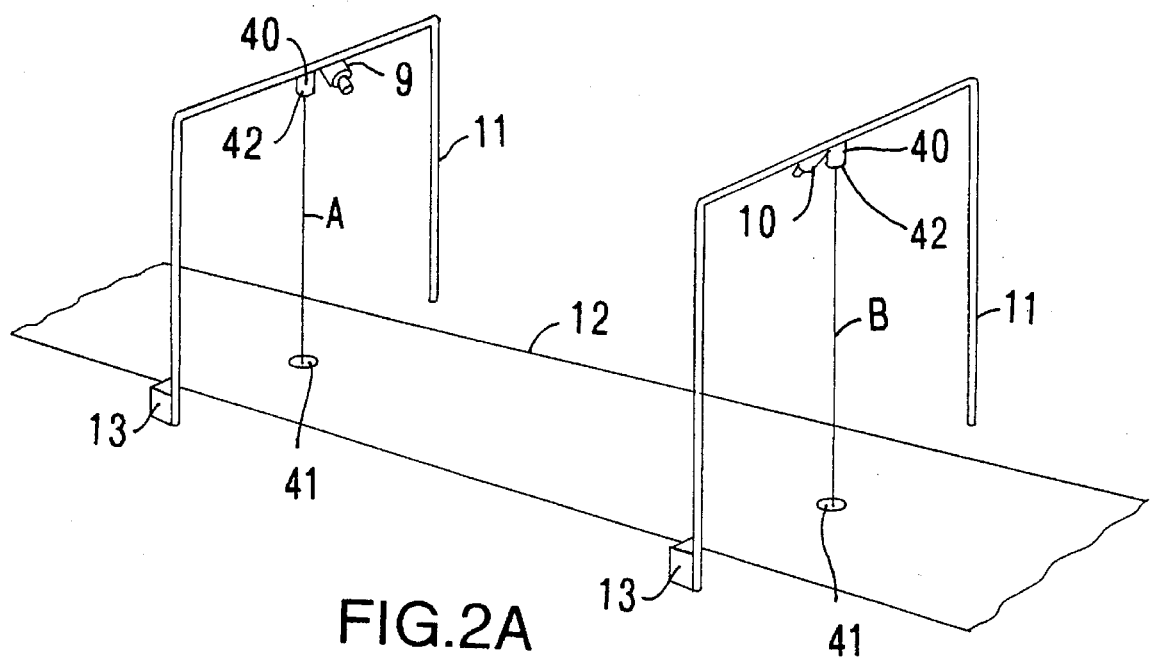
FIGS. 2A and 2B are perspective views of mounting systems for the video cameras and for the double light beam system, which is the first embodiment of a car length measurement system.

It is important that the camera system and measuring system detect almost all the cars in its area and that the license plate numbers be read with great accuracy. Since the presently available license plate readers operate at no more than 90% accuracy, this presents a problem. A possible solution is based on redundancy and voting. For example, if two readings are made of the rear plate and two readings of the front plate, an acceptable result would be a match between one front plate reading and one rear plate reading. The cameras and computer systems may be arranged in different ways to obtain these results. Some suitable arrangements are:

(i) One camera takes pictures of the front plates and a second camera takes pictures of the rear plate, as in FIG. 2A. Both cameras are connected to a high speed license plate reader, such as a RACAL, which can analyze a plate in 250 ms. Each camera takes two frames for analysis, for a total of 4 frames, which are analyzed by the computer in sequence, for 1 second total of analysis. The four results are compared. An acceptable reading consists of one match from the front and rear plates.

A false positive (incorrect plate reading) is highly unlikely if one assumes that the reading errors are random. In theory, assuming that the 10% error on each reading is random, at least 98% of the plates would be read and almost no accepted results would be incorrect.

(ii) Two cameras are used for the front plate and two cameras are used for the rear plate. Each camera is connected to a separate computer board or processor and the four readings are processed in parallel.

(iii) Two cameras, or one camera generating two frames, are used for each of the front and rear plates. The cameras send their video images to a central processing computer over appropriate communication lines, discussed below.

The data base is a list of registered vehicles and contains, for each vehicle, its "associated information", namely its model number and color.

The computer system has a look-up table, or other computer memory system, providing the length, width and, if used, headlight pattern for each model and model year.

The input is the license plate number and the output is the length of the vehicle registered under that plate number. The output may also include that vehicle's width, color and headlight and rearlight patterns.

The basic database, for one state, may be that state's motor vehicle department central computer. In New York State that computer may be accessed by a appropriate law enforcement agency, using a dedicated telephone line, and will, upon receipt of a license plate number, search its data base and transit the requested associated information in less than 500 ms.

Alternatively each camera may have its own data base. For example, using an optical CD ROM, which is replaced monthly, 100 million license plate numbers and their associated information (length, width, color, owner's name, etc.), about 100 bytes per plate, is a data base of 10 billion bytes (10 gigabytes). These may be stored in a writable CD optical disk having under 20 ms retrieval time. New license plate information may be added daily over a communication line and stored on the same, or separate, storage disks.

Figure 2B:
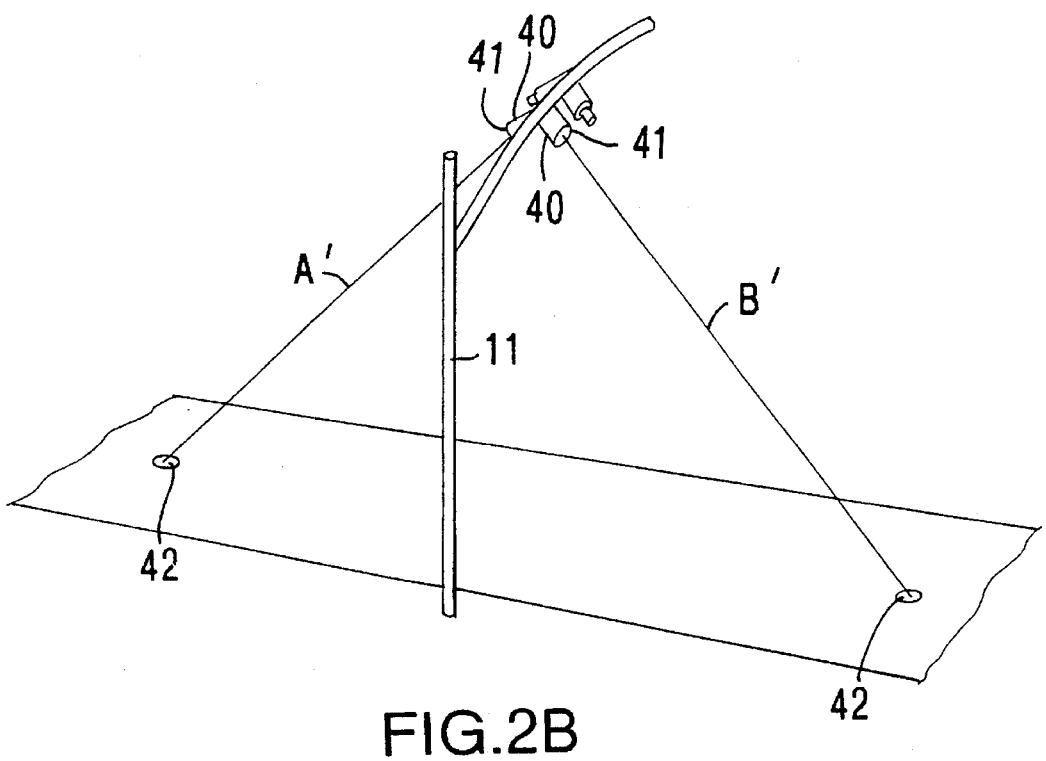

The preferred method of obtaining the length of the car, which is simple and cost effective, is to use two light beams A and B, FIGS. 2A and 2B. Each beam is directed at opposite ends of a space which becomes occupied by a moving car, i.e., each beam, in sequence, is broken by the car. If the two beams are A and B, as shown in FIGS. 2A and 2B, the front of the car will break (interrupt) beam A and then break beam B. Each beam acts as a switch which is "on" (unbroken) or "off" (broken by the presence of a car).

The distance bet Teen beams A and B is exactly determined and known. Preferably it is somewhat longer than the longest vehicle sought to be detected. For example, the space between beams A and B is set at exactly 22 feet (FIG. 2A) (9.6096 meters). The time it takes the front of the car to first break beam A and then break beam B measures by the speed of the car. A car traveling at 60 mph (miles per hour) (96.3 km. per hour) travels at 88 feet/sec or 1056 inches/sec (2682.24 cm/sec) and the time from beam A to beam B is 0.947 milliseconds. Once the speed of the car is derived, its length may readily be automatically computed, using the timing information from the "on" and "off" of beams A and B.

Preferably the speed is determined from the average speed of the front and back of the car, as the car may be accelerating or decelerating between beams A and B. The speed of the front of the car is the time from beam A being off to the time beam B is off. The speed of the back of the car is the time beam A goes from off to on to the time beam B goes from off to on. Those two speeds are averaged to arrive at "average speed".

At any one average speed, the longer the time period the beams A and B are off, the longer is the length of the car.

The length of the car is preferably the time beam A is off averaged with the time beam B is off, i.e., "average time beam interrupted". The formula to determine car length is as follows:

car length=average time beam interrupted average speed

The average time beam interrupted is shown in milliseconds, the average speed is in miles per hour, and the length of the car is in inches, in the following examples:

TABLE I

| Av. Speed m.p.h. | Av. time ms. | length of car (inches) |
|---|---|---|
| 60 | 94.70 | 100 |
| 61 | 93.14 | 100 |

TABLE I-continued

| Av. Speed m.p.h. | Av. time ms. | length of car (inches) |
|---|---|---|
| 62 | 91.64 | 100 |
| 63 | 90.18 | 100 |
| . | . | . |
| . | . | . |
| . | . | . |
| 70 | 81.17 | 100 |

TABLE II

| Av. Speed m.p.h. | Av. time ms. | length of car (inches) |
|---|---|---|
| 60 | 95.65 | 101 |
| 61 | 94.07 | 101 |
| 62 | 92.56 | 101 |
| 63 | 91.08 | 101 |
| . | . | . |
| . | . | . |
| . | . | . |
| 70 | 81.98 | 101 |

It is seen that at 60 mph the difference between a 100-inch long and a 101-inch long car is 0.95 ms. The computation may use the formula, as above, or may use a look-up table stored in computer memory. The look-up table preferably has mph from 1 to 120 and average times corresponding to lengths from 80 to 250 inches.

The beams A and B, as shown in FIG. 2a, each may consist of three, or more separated beams. The purpose of these multi-beams is to insure that cars are detected although they are not in the center of the lane and to insure operation in the event one beam is disabled. Preferably the beams are separated sideways (perpendicular to the direction of traffic) by about 2 feet (0.9144 meters). The shortest length measured by the separated beams is taken as the measured length, as the longer measures may occur because of spare tires on the back of some vehicles or items protruding from their trunks. In operation, preferably the first of the beams, A1, A2 and A3, and then B1, B2 and B3, which is interrupted is taken as the signal source and the other output signals are not used.

Preferably the beams are laser beams from lasers 40 mounted on an overhead structure as shown in FIG. 2A. An alternative mounting from a light fixture or stop light is shown in FIG. 2B using beams A' and B'. In this alternative the lengths of various models should be obtained by experimentation. The beams are reflected back, from reflectors 41 fixed on the roadway, and detected by photoresponsive transducers 42 (photodiodes or phototransistors) next to the lasers on the overhead structure. To avoid the adverse effects of sunlight, headlights, etc., each laser may be pulsed with a distinctive digital pattern or code so that amplitude effects may be lessened. Alternatively, infra-red beams may be used, which would also preferably be pulsed with a suitable pattern or code. If the target vehicle is accelerating or decelerating the speed may be too uncertain and the length measurement distorted. Consequently, it is preferred that if the speeds as measured by beams A and B differ for more than 2 mph (3.22 km/hr) the data as to that vehicle not be used.

It is optional to identify a second and third physical characteristic of the target vehicle. For example, if the primary physical characteristic is length, the second physical characteristic may be width and/or color. In many states the color of a vehicle is part of its registration information. If the car is new (3 years old or less) it is unlikely to have been repainted. Generally cars are repainted their original color. Consequently the registered color is likely to be the actual color of a new vehicle. A system to detect color preferably consists of an illumination beam of visible light, for example, in the center of the two laser beams mentioned above which is timed to flash on by beam A (or A') and which preferably illuminates the top of the hood. The car's reflection is viewed by three photoresponsive elements (photodiodes or phototransistors) in front of which are mounted suitable color filters, for example, standard red, green and blue filters. The outputs of the photoresponsive elements, timed by the initial laser beam, indicates if the car is, for example, blue, green, red, black, white or other.

In the case of various models the lengths are the same or very close to each other. . For example, in 1995 models the Chevrolet Monte Carlo is 200.7 inches (509.8 cm) long and the Chevrolet Lumina is 200.9 inches (510.3 cm) long; the Dodge Intrepid is 201.7 inches (512.3 cm) long; Eagle Vision 201.5 inches (511.8) long and the Chrysler Concord 201.5 inches (511.8 cm) long; the Buick LeSabre is 200.0 inches (508 cm) long and the Oldsmobile 88 is 200.4 inches (509 cm) long; the Buick Skylark is 189.2 inches (480.6 cm) long and the Oldsmobile Ciera is 190.3 inches (483.4 cm) long.

Even, if by chance, the thief has stolen a car and used the registered plates of a car of the same, or close, length, if the detected color does not match the registered color the plate is likely to be a switched plate.

With this system mistakes may occur, for example, because a car is carrying an object which protrudes form its trunk increasing its apparent length. However, the police officer will be informed of the car model which is registered to a plate, and if he sees it is the same model he would not stop the car. Similarly, a video image of the car may be transmitted to a central station and an operator would ascertain that the car model matches the license plate; although the system has reported a mismatch.

Figure 3A:
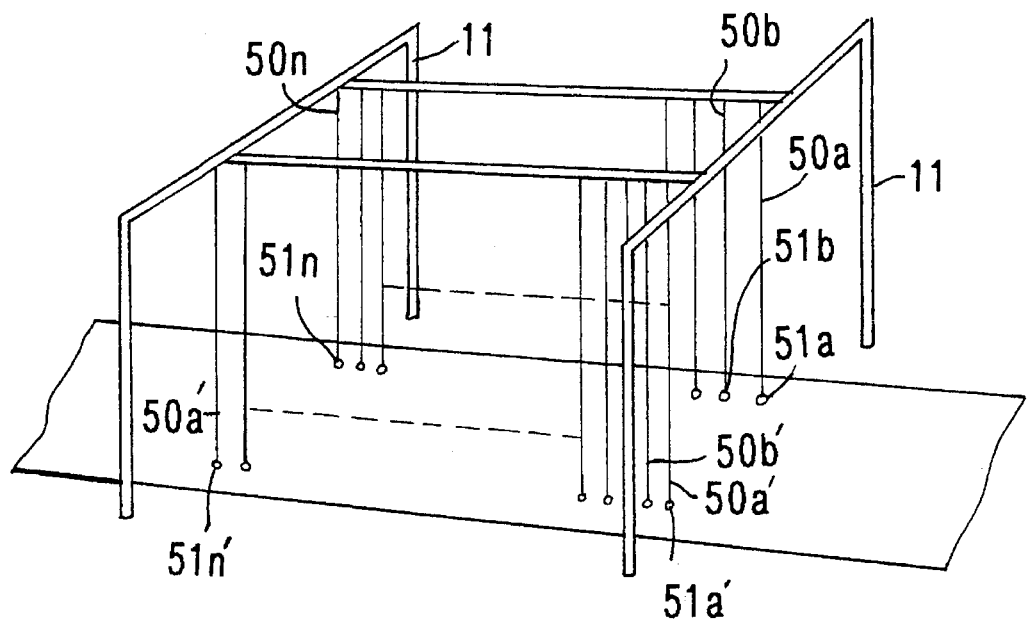
FIG. 3A and 3B are perspective view of a second embodiment of a car length measuring system and of a car width measuring system, respectively.

An alternative system for measuring car lengths is shown in FIG. 3A. This system is particularly useful when cars are moving slowly or are fully halted, for example, at a toll plaza. In this system a series of light beams 50a–50n(where n is from 50 to 250), preferably laser beams or infra-red beams, are aligned in a line along the direction of traffic and in the center of a traffic lane. Preferably the beams are spaced 1 inch apart (2.54 cm) and there are at least 50 beams and preferably 250 beams. A car will break (interrupt) the number of beams according to its length. For example, a 120-inch (304.8 cm) car will interrupt 120 beams, spaced 1 inch apart (2.54 cm). Each beam has a reflector 51a–51n also spaced 1 inch (2.54 cm) apart, aligned in a row and fixed beneath the beam generators on the roadway. The reflectors 51a–51n each reflect a beam back to a photoresponsive transducer. Preferably also second lines of beams 50a'–50n' and reflectors 51a'–51n' are used, spaced about 3 feet from beams 50a'–50n' and parallel thereto. Alternatively, instead of using reflectors, the line of photoresponsive transducers (photodetectors) may be located on the roadway and a single laser, or infra-red generator, may be positioned overhead which sweeps its beam rapidly, i.e., 1/100 second, back and forth over the line of photodetectors. This system of direct measurement of car length does not require any measurement of speed.

This system of direct measurement using multi-photodetectors is preferably also used to measure the width of cars. This width measurement system is also preferably used with the double-beam system of FIG. 2A and 2B, and the multi-beam system of FIG. 3A, to provide car width information.

Figure 3B:
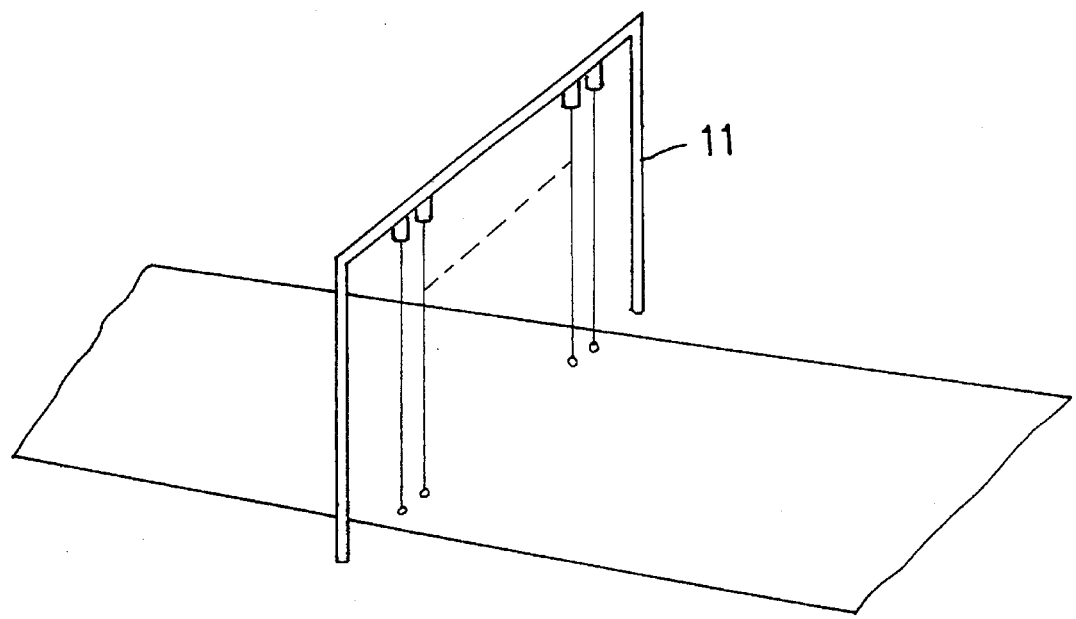

As shown in FIG. 3B a line of light beams 53a–53n, one inch apart (2.54 cm), at least 20 beams and preferably 200 beams, and reflectors 54a–54n on the roadway are aligned perpendicular to the flow of traffic, i.e., across a traffic lane. For example, if 60 beams are interrupted the width of the car is 60 inches (152.54 cm).

The engineering decision as to how much of the system should be on the overhead structure over a roadway and how much should be at a central traffic location (central computer facility) depends on various factors, such as (i) is the system in an urban or rural location, (ii) is there an existing video and/or dedicated telephone communication network which may be utilized, (iii) the cost and speed of computers, at each camera, as against the cost and speed of a central computer, (iv) the cost and speed of maintaining a reasonably current data base of registered vehicles (preferably covering all 50 states) and their associated information at each camera, as against a single data base at a central computer facility.

In connection with the communication network, if a log map image is used of less than 40,000 pixels, that raw image may be transmitted over a I.S.D.N. telephone line for analysis (license plate recognition) in less than 500 ms. It may be possible to employ the unused channel capacity of existing cable TV systems or existing traffic light controlling systems to transmit video images of license plates for analysis at a central computer facility. A cable modem could transmit the 40,000 pixels in less than about 12 ms.

It is also possible to use a number of CPU's (Central Processing Units) at each camera installation to increase processing speed. For example, if 4 frames (from 2 cameras) are to be analyzed to read license plate numbers, 4 CPU's, or other computer processors, may be used simultaneously, one for each frame.

In the preferred embodiment set forth above, a physical characteristic, preferably length, is measured and compared with the length, derived from a data base, for the target vehicle. This is termed processing by exclusion, i.e., the excluded target vehicles are those for which the physical characteristic (length) does not match the same characteristic obtained from the registration data base.

An entirely different approach is set forth below. In this second, and less preferred, approach, the model of the target car is recognized and then a search is made of a list of license plates issued for that model to see if the target car's license plate is on that list. If it is not (mismatch) the target car may be carrying switched plates and may be stolen.

If, for example, a 1995 white Ford Taurus is reported stolen, the system is instructed, by the control computer, to report the license plate numbers of all cars whose length is the same as the 1995 white Ford Taurus cars (the "car group"), i.e., all white cars whose length is 192.0 inches (487.7 cm). Over the next 24 hours it reports the license plate numbers of 30 such cars, 29 of which match legitimate license plate numbers for those cars. However, the 30th car has a license plate number which does not match any car of the car group. The control computer immediately reports the mismatch to the police, saying, "possibly stolen car reported by camera at Main Street and Fourth Avenue, car is 1995 white Ford Taurus with license plate New York EEK 777". The police will also be informed, or have been informed, that the car may be the one reported stolen from the parking lot. The entire process of identifying the stolen car and reporting its position will take less than four seconds, so the car should still be in the general area of the camera, i.e., at 60 miles per hour it will be within 360 feet.

Preferably the camera computer system has two parallel computers, one to process the license plate numbers and the other to process car group matching. Each of these template matching procedures will take less than one second.

Preferably the group of cars to be searched ("car group") depends primarily on the length of the car. Preferably a range of lengths is taken, Centered on length measured by the length measuring system, and all cars in that range (group) are targeted (license plates read). For example, if the measuring system determines that the car is 200 inches long the range (group) consists of all cars 199 to 201 inches long. In the 1995 model year in United State generally available models, that is about 10 models.

The width of car bodies varies less than their lengths and is less helpful than length distinguishing one model from another. However, car width in some cases is an important guide in distinguishing car models having about the same length. For example, in 1995 car models the following cars are about (with 1 inch plus and minus) 186 inches in length:

| Model | Length | Width |
|---|---|---|
| BMW-5 Series | 186 | 69 |
| Chevrolet Astro | 187 | 78 |
| Chrysler Cirrus | 186 | 71 |
| Chrysler LeBaron Conv. | 185 | 69 |
| Dodge Avenger | 187 | 69 |
| Dodge Stratus | 186 | 71 |
| GMC Safari | 187 | 78 |
| Honda Odyssey | 187 | 71 |
| Hyundai Sonata | 185 | 70 |
| Mercedes-Benz E-Class | 187 | 69 |

In this example width helps in the cases of the Chevrolet Astro and GMC Safari; but the other cars in this group have a width in the range of 69–71 inches. 8 models in this group have a length of 185–187 inches and a width of 69–71 inches. So another method must be used to distinguish between the 8 models in this group.

The car group template matching procedure may preferably be based on the following analysis of two frames of the car's image. One image is of the front of the car and the second image is of the rear. The two images will emphasize the reflection from the glass and/or plastic front and rear light lenses. The size, location and shape of such lenses are often characteristic of a car model. Also, since the edges are known, the camera will center itself along the center.

A car's lenses are generally distinctive and, at night, would preferably be illuminated by a flash of infra-red light. The headlight lenses are (i) symmetric, so only the left headlight lens (or the right) need be imaged and analyzed, and (ii) at the front of the car at a certain height. A picture of the front of the car would show that its headlight lens is within about 10 inches from the front of the car. Preferably the car's headlight lens is compared to the headlight's lenses of cars of the same length (within 1 or 2 inches plus and minus) so that comparison may be of, at most, 10 headlight lenses Various pattern recognition and template matching systems may be used, for example, the system of U.S. Pat. No. 5,175,775, incorporated by reference.

Often the car's logo is at its center, either at the front of the hood or on the trunk cover (boot). The logo can be "read" by the same type of program as the license plate character reading program. It is estimated that there are about 200–300 models for a five-year period, each of which may be distinguished primarily by its length and secondarily by its light lenses and logos.

The number of cars within each group is a manageable number. For example, the most popular car, i.e., the most cars sold in any model, is the 1988–1994 Ford Taurus, having sales of about 500,000 per year, i e , 3 million sold If 10% were sold in New York and ¼ were white, the car group consisting of one state's license plates issued for one model and color would be about 75,000 cars.

In a preferred embodiment of the present invention a historical record is made at each camera system of all the identifications of cars, by model (length and light lenses), color and license plate and time. For example, if 50,000 cars pass one camera system each day, it will record and retain for 30 days their license plate numbers, models and colors, so that any car may be traced. If any camera systems are installed in a network covering the roads of an area, it is possible to trace the movement of a stolen car, or any other car, through the network and determine its path, times and last location. This may be useful in proving that an alleged criminal's car was in the area of a crime. For example, if a car is stolen and the camera system determines that its switched (false identification) license plate number is "XYZ 123" then all the camera systems of the network are interrogated over a transmission line, if that plate number is on their record. If so, the camera system reports its own location and the time it viewed that plate number to a central police facility.

At a busy traffic lane a car may pass each second. 21,600 cars may pass an hour or 250,000 cars a day (reduced traffic at night). If each license plate and related data (time, date, location, etc.) comprises 20 bytes, each camera system would generate 5 million bytes per day. A network of 1000 cameras would generate 5 billion bytes per day. The data from large network can be recorded, for almost 2 days, on a 9 GB hard disk, for example, Seagate Elite (TM) and a month's data backed up on a 280 GB tape subsystem, for example DLT 4700 (TM), or jukebox of recordable Super Density (SD) disk drives or magneto-optical or phase-change devices.

In this embodiment, until a car is reported as being stolen there is no attempt to match the recorded license plate numbers with lists of cars. However, if a car is reported stolen, a search is then made, under its model and color, for the license plate numbers. That list of license plate numbers, as in the prior "real time" embodiment, is checked against the list of valid license plate numbers for that specific model and color. A mismatch indicates that the plates have been switched, the car stolen, and the switched (false) plate identified. That false plate may then be traced as its car was driven through the network. Preferably each model, year and color is number-coded for simplicity of searching and to converse memory capacity. Assuming a time and date code and an eight-digit license plate number, i.e., "N.Y. 678 AKW" and a four-digit car identification code number, i.e., "0678" for a 1991 white Ford Taurus, the , memory for a ten-day record of a daily flow of 250,000 cars is less than 50 million bytes.

In regard to color it is preferable that there be only 3–5 categories, for example, red, white and other (black, green, blue, etc.). It may be difficult to detect an exact color, for example, "Ford 1994 blue" because cars may be dirty or sun-faded. The problem of cars being repainted after being registered is not serious. Firstly, it is generally new cars that are stolen and old cars that are repainted. Secondly, generally owners repaint cars in their original color or one close to it, i.e., white cars are generally repainted white, cream, beige, etc. Thirdly, the owner reporting a stolen car should be asked its present color and the color under Which it is registered. The repainted colors should then be used for the search. For example, a stolen Ford Taurus which was originally white and repainted red should be searched under the red color, since it is now red.

A problem arises when a legal car has been repainted and its new color not registered and a car is reported stolen of the same color, make and model. In that case the legal car will be identified as the stolen car since it does not have a license plate number falling within the list of legal plates for that color, make and model. A solution is to check the plate number of the suspected car, before stopping the car, to ascertain if it is the same make and model—if so, it is likely to be legal.

The data stream 16, of all license plate numbers, in both the first and second embodiments (FIGS. 1 and 4) is transmitted to the "wanted car" database and compared to the license numbers in that database. Preferably the "wanted car" database consists of a list of recently stolen cars "scofflaw" cars (cars having numerous unsatisfied traffic violations), cars likely to be illegally driven by drivers with suspended licenses, and cars which do not have the legally required minimum insurance.

Figure 4:
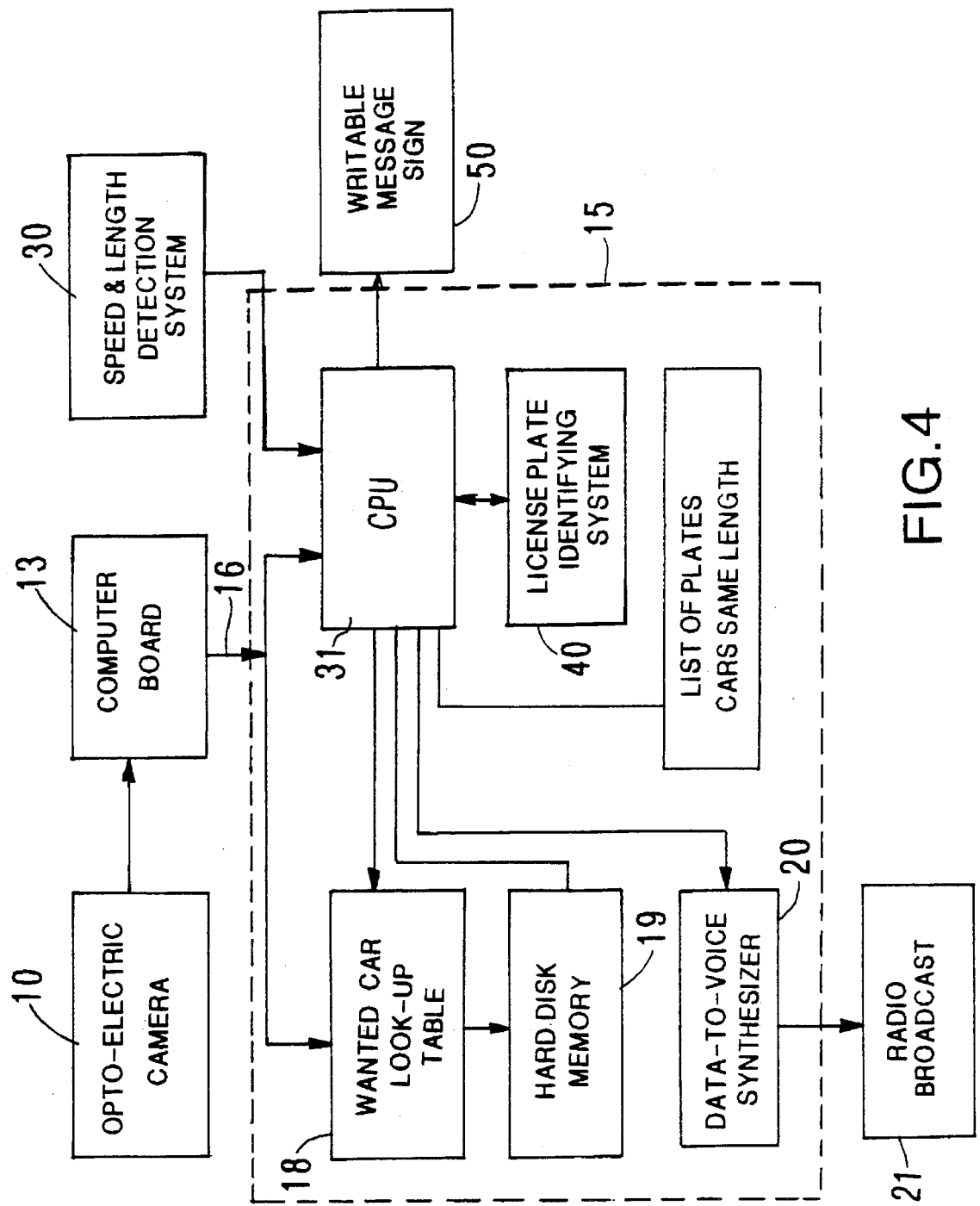
FIG. 4 is a block schematic diagram of the second embodiment of the present invention.

As shown in FIGS. 1 and 4, the "wanted car" database is preferably a look-up table 18 of license plate numbers executed in electrically changeable solid-state memory, for example, a EEPROM (Electrically Erasable Programmable Read Only Memory). That look-up table 18 is changed often, for example, hourly, as cars are reported as stolen. Its list of wanted car license plate numbers is changed, preferably over a telephone line from police headquarters, having a front-end computer which broadcasts revised lists to all the "wanted car" databanks in the system.

The data in look-up table 18 is compared to the license plate numbers of data stream 16 with its list of wanted cars to determine if there is a match, preferably as explained below. The data from the EEPROM look-up table 18 is downloaded into the RAM of the CPU 31 and stored in an 18×48 bit array. The license plate identifying system 40 produces a track and sector pointer to the hard disk memory 19.

In one embodiment, a "hashing algorithm" is employed to generate the pointer which maps the license plate number to a track and sector. A hashing algorithm is a method of quickly retrieving data by assigning each data item a "key" which maps to a physical file location. The key is generated by a modulo division of the license plate number using a prime divisor approximately equal to the total number of storage locations The modulo quotient (remainder) is the key (see following example)

HASHING EXAMPLE

Assume 10,000 storage locations
License #is 741
741/9998=6R 4114
Divide 4114 by number of bits per track/sector to determine physical location for data. A sequential search is then performed in the identified disk sector.

B-TREE FORMAT

In an alternative embodiment, the license plate data on hard disk memory 19 is stored in "b-tree format".

A b-tree format consists of several levels of linked pointers which enable the software to locate a data item based upon a small number of lookups. For example, if data for license number 100 i at track 1 sector 2, the lookup would first determine where licenses less than 999 were stored, then where licenses less than 499 were stored, and then where licenses less than 124 were stored. Then the licenses less than 124 would be searched sequentially.

In another alternative embodiment the license plate numbers are stored according to an indexing scheme which maps particular ranges of license plate numbers to a given track and sector. The hard disk computer memory 19 contains "associated information" (information associated with the license number) for each car such as registered owner, model, make, year, owner, color, and the reason it is on the "wanted" list.

When a match is found, and the associated information (model, make, etc.) retrieved from memory 19, the license plate number and associated information is broadcast by local radio transmitter 21, mounted on support structure 11, to police cars in the area. A suitable broadcast system would entail a two-way digital communication system using microwaves in the 2.5 gigahertz band. The system should be two-way, because the database which stores the "wanted cars" is updated periodically and the system transmits associated information to police cars in the area. In addition, the radio system is also able to relay information to the police cars which have an in-vehicle navigation and communication system.

In addition, or alternatively, the information may be transmitted by means of a radio paging network. The police cars would have receivers mounted on their dashboards which would pick up the transmitted information and either display it on a CRT, synthesize the data into voice, or print the data. The information about the "wanted cars" may also be displayed on a cathode-ray-tube (CRT) situated on the dashboards of police cars.

Preferably the digital data format information is converted to voice information by a conventional data-to-voice synthesizer 20. Alternatively, or in addition, it may be broadcast as a data stream and converted to a print-out by a data to alpha-numeric printer in the police cars.

The digital data stream from camera 10 is also transmitted to a license plate number matching system 40 which attempts to match the license plate numbers of all vehicles of the "wanted type" with a list of registered vehicles. When a match is obtained, no further action is taken. In one preferred embodiment the license number is matched with a list of license numbers, which are all the license numbers of a wanted type, in a state, in a large rapid access solid-state look-up table. In a preferred embodiment the license data is stored and accessed according to the same techniques employed in the wanted car identification process described herein. Preferably, because of its lower cost, the Look-up table is in hard disk (Winchester drive) whose access time is about 20 milliseconds. Standard data compression techniques could be used to increase the amount of license data stored.

Alternatively, particularly in the urban areas of large states, such as the New York City area and the Los Angeles area, the license plate number matching system may be at a central location to serve a number of camera systems at remote locations. In that type of network the license plate numbers, in a digital stream, are transmitted over a land line such as a dedicated telephone line (twisted wire pair, coaxial or fiber optic cable) to a central license plate number matching computer, for example, at police headquarters or at a traffic management center. Such a network presents a cost advantage since its central computer is used for a number of camera systems.

The database of "wanted cars" and/or the database of "wanted types" of license plate numbers and associated information may be stored in a mainframe computer. The mainframe computer will be located at police headquarters or at a Traffic Management Center (TMC). The disclosed camera system can tap into the database via a telephone line or through wireless communications means. The latter may include the use of a communications satellite in inner orbit. The satellite would pick up the electromagnetic waves from the transmitters, which are located at various points on the roadways, and re-direct the waves to the location of the database. The database would then be searched as disclosed above. If any matches of "wanted cars" or non-matches of "wanted type" are discovered, a transmitter would be used to contact a police car near the area where the wanted car was "picked up".

This satellite Communication system, although not currently available, may be available in the future and may be useful in rural areas. The camera and data transmission system may also be utilized as part Of a traffic surveillance system, since it may provide real time information on the speed and number of cars passing the camera. Such information may be communicated to the Traffic Management Center (TMC).

The "wanted car" database is optional and the car theft system may be implemented without it. However, it takes advantage of the camera 10 and radio broadcast transmitter 21 of the car theft system.

What is claimed is:

1. The method of detecting vehicles displaying incorrect license plates, including the steps of:
   (a) using a camera to form an image of a license plate of a target vehicle which is within area of the camera;
   (b) converting the image into digital data representing the number of the license plate;
   (c) measuring a physical characteristic of the target vehicle;
   (d) deriving from a data base of license plate numbers a physical characteristic based on the license plate number read from the target vehicle;
   (e) comparing the measured physical characteristic with the physical characteristic derived from the data base and in the event of a mismatch generating a warning signal.

2. A method as in claim 1 and measuring the physical characteristic of length of the target vehicle for the comparison of (e).

3. A method as in claim 2 and measuring the length of a traveling target vehicle by positioning two separated light beams, having the target vehicle interrupt both light beams in sequence to determine its speed, measuring the time the target vehicle interrupts a light beam as it travels therethrough, and calculating the vehicle's length from its speed and the beam interruption time.

4. A method as in claim 2 and measuring the length of a target vehicle by having the vehicle interrupt some of series of over 50 light beams and counting the number of light beams interrupted by the target vehicle as a measure of its length.

5. A method as in claim 1 and measuring the physical characteristic of width of the target vehicle for the comparison of (e).

6. A method as in claim 5 and measuring the width of a target vehicle by having the vehicle interrupt some of a series of over 20 light beams arranged across a path of travel of the vehicle and counting the number of interrupted beams as a measure of its width.

7. The method of claim 1 and producing a log map image using a video camera in step (a), the log map image having less than 40,000 pixels.

8. The method of claim 1 and using a computer based template matching method or a neural network computer for the conversion of step (b).

9. A method as in claim 1 and using a space-variant sensor in (a) to produce a logmap image of the license plate.

10. A method as in claim 1 and further including transmitting the mismatched license plate number and the physical characteristic of the target vehicle to a police officer.

11. A method as in claim 1 and further including automatically reading and matching the license plate numbers of target vehicles with a database of wanted vehicles, said wanted vehicle database including a list of license plate numbers of vehicles which have been stolen.

12. The method of detecting vehicles displaying incorrect license plates, including the steps of:
   (a) automatically reading the license plates of vehicles within a certain location;
   (b) generating digital data representing the vehicles' license plate numbers;
   (c) measuring the length of the same vehicles;
   (d) transmitting the digital data to a computer system having a data base of registered license plate numbers and deriving therefrom the vehicles' lengths according to their registrations; and
   (e) comparing the measured lengths to the derived lengths and, in the event of a mismatch, indicating that a mismatched plate may be incorrect.

13. The method of detecting vehicles displaying incorrect license plates, including the steps of:
   (a) using a video camera to form a video image of a license plate of a target vehicle which is within area of the video camera;
   (b) converting the video image into digital data representing the number of the license plate;
   (c) using a video camera to form a video image of the target vehicle;
   (d) converting the vehicle video image into digital data representing an identification of the model of the target vehicle;
   (e) comparing the digital data representing the license plate number with a list of license plate numbers for the model of the target vehicle; and
   (f) providing an indication of a mismatch, indicating that the vehicle may be displaying illegal license plates, in the event the comparison does not find that the target vehicle's license plate number on the list.

14. The method of detecting vehicles displaying illegal license plates, including the steps of:
   (a) using a camera to form an image of a license plate of a target vehicle which is within area of the camera;
   (b) converting the image into digital data representing the number of the license plate;
   (c) measuring a physical characteristic of the target vehicle;
   (d) comparing the digital data representing the license plate number with a list of license plate numbers of vehicles having the same physical characteristic;
   (e) providing an indication of a mismatch, indicating that the vehicle may be displaying illegal license plates, in the event the comparison does not find the vehicle's license plate number on the list.

15. A system for detecting vehicles displaying incorrect license plates, including:
   (a) camera means to form an image of a license plate of a target vehicle which is within range of the camera;

(b) license plate reading means to convert the image into digital data representing the number of the license plate;

(c) measurement means to measure a physical characteristic of the target vehicle;

(d) computer means to derive a physical characteristic from a data base of license plate numbers and the target vehicle's license plate number digital data;

(e) computer means to compare the physical characteristic derived from the license plate number and data base with the measured physical characteristic;

(f) means to provide a warning that the target vehicle may be displaying incorrect license plates in the event of a mismatch.

16. The system of claim 15 wherein the camera means of (a) generates a log map image having less than 40,000 pixels.

17. A system as in claim 15 wherein the physical characteristic is the length of the target vehicle.

18. A system as in claim 15 wherein the physical characteristic is the width of the target vehicle.

19. A system as in claim 15 and including means to generate two separated light beams positioned so that the target vehicle interrupts both light beams in sequence to determine its speed, and means to measure the target vehicle's length from its speed and the beam interruption time.

20. A system as in claim 15 and including a series of over 50 light beams and means to count the number of light beams interrupted by the target vehicle as a measure of its length.

21. A system as in claim 15 and including a series of over 20 light beams arranged across a path of travel of the target vehicle and means to count the number of interrupted beams as a measure of its width.

22. A system as in claim 15 and further including means to transmit the illegal license plate number and identification of the target vehicle toga police officer.

23. A system as in claim 15 and further including means to automatically read and match the license plate numbers of vehicles with a database of wanted vehicles, said wanted vehicle database including a list of license plate numbers of vehicles which have been stolen.

24. A system for detecting vehicles displaying incorrect license plates, including:

(a) video camera means to form a video image of a license plate of a target vehicle which is within area of the video camera;

(b) license plate reading means to convert the video image into digital data representing the number of the license plate;

(c) means to identify the model of the target vehicle;

(d) computer means to compare the digital data representing the license plate number with a list of license plate numbers of the same model as the target vehicle; and (e) means to provide an indication of a mismatch indicating that the target vehicle may be displaying illegal license plates in the event the comparison does not find the target vehicle'license plate number on the list.

25. The system of claim 24 wherein the camera means of (a) generates a log map image having less than 40,000 pixels.

26. The system of claim 24 wherein the converter means of (b) is a computer using a template matching algorithm.

27. A system as in claim 24 wherein in (a) the video camera means is a space-variant sensor which generates a logmap.

28. A system as in claim 24 and further including transmitting means to transmit the illegal license plate number and the identification of the target vehicle to a police officer.

29. A system as in claim 24 and further including computer means to automatically read and match the license plate numbers of vehicles obtained from (b) with a database of wanted vehicles, said wanted vehicle database including a list of license plate number of vehicles which have been stolen.

* * * * *